United States Patent
Michi et al.

(10) Patent No.: US 7,096,107 B2
(45) Date of Patent: Aug. 22, 2006

(54) DEVICE FOR THE LONGITUDINAL GUIDANCE OF A MOTOR VEHICLE

(75) Inventors: Harald Michi, Oelbronn-Duerrn (DE); Michael Scherl, Bietigheim (DE); Michael Weilkes, Sachsenheim (DE); Werner Uhler, Bruchsal (DE)

(73) Assignee: Robert Bosch GmbH, Stuttgart (DE)

( * ) Notice: Subject to any disclaimer, the term of this patent is extended or adjusted under 35 U.S.C. 154(b) by 86 days.

(21) Appl. No.: 10/868,132

(22) Filed: Jun. 14, 2004

(65) Prior Publication Data

US 2005/0015184 A1    Jan. 20, 2005

(30) Foreign Application Priority Data

Jun. 12, 2003 (DE) ................................ 103 26 562

(51) Int. Cl.
*G06F 7/00* (2006.01)
*B60K 31/00* (2006.01)
(52) U.S. Cl. ...................................................... 701/70
(58) Field of Classification Search .................... None
See application file for complete search history.

(56) References Cited

U.S. PATENT DOCUMENTS

| | | | | |
|---|---|---|---|---|
| 5,189,618 A | * | 2/1993 | Tsujii et al. | ................... 701/93 |
| 6,098,007 A | * | 8/2000 | Fritz | ............................ 701/93 |
| 6,233,515 B1 | * | 5/2001 | Engelman et al. | ............ 701/96 |

* cited by examiner

*Primary Examiner*—Michael J. Zanelli
(74) *Attorney, Agent, or Firm*—Kenyon & Kenyon LLP

(57) ABSTRACT

A device for the longitudinal guidance of a motor vehicle, having a sensor device for the location of objects in the nearfield of the vehicle, a controller which generates a reference variable for a motion variable of the vehicle for the regulation of the vehicle's speed, as a function of the location data of the sensor device, and an actuator which has an effect on the motion variable as a function of the reference variable, wherein a mathematical model of the actuator is stored in a memory, which describes the dynamic behavior of the actuator, that is, it produces a relationship between an input variable supplied to the actuator and an output variable of the actuator; and a compensating element is provided to convert the reference variable, by way of the model, into the input variable in such a way that the dynamic behavior of the actuator is compensated for.

7 Claims, 1 Drawing Sheet

DEVICE FOR THE LONGITUDINAL GUIDANCE OF A MOTOR VEHICLE

FIELD OF THE INVENTION

The present invention relates to a device for the longitudinal guidance of a motor vehicle, having a sensor device for the location of objects in the nearfield of the vehicle, a controller which generates a reference variable for a motion variable of the vehicle for the regulation of the vehicle's speed, as a function of the location data of the sensor device, and an actuator which has an effect on the motion variable as a function of the reference variable.

BACKGROUND INFORMATION

An example of such a device is a so-called ACC system (adaptive cruise control), which makes it possible, among other things, to adapt the speed of the vehicle to the speed of a preceding vehicle that has been located with the aid of a radar system, so that the preceding vehicle is followed at a suitable safe distance. To do this, the ACC system intervenes in the drive system and, if necessary, also the braking system of the vehicle. Thus, in this case there are two actuators, namely, the drive system and the braking system, and the reference variables refer to the acceleration by way of the drive system and/or the braking slowdown. The reference variables may each be also described by an executive function over a specified time period.

ACC systems currently being used are generally designed for travel at higher speeds, for instance, on express highways. In this context, there will generally be only slight accelerations and slowdowns, and the reference variables have only low dynamics, i.e. small rates of change over time, which the actuators are able to follow with negligible time delay.

However, if such longitudinal guidance systems are also to be used in situations that are characterized by greater dynamics, for example, in stop-and-go traffic or in urban traffic, then the dynamic behavior of the actuators can often be no longer ignored.

SUMMARY OF THE INVENTION

The present invention offers the advantage that, even in situations having greater dynamics, an influencing control that is sufficiently accurate and predictable in its effects on the respective motion variable is made possible. For this purpose, according to the present invention, the dynamic behavior of the actuators, that is, for example, the drive system and/or the braking system, is to a great extent compensated for with the aid of mathematical models. The behavior of each actuator is simulated, in this context, by a mathematical model specially attuned to this actuator, which produces a relationship between the input variable supplied to the actuator and the output variable given out by the actuator. Therefore, in the light of this model, it is sufficiently accurately predictable what effect the change in the input variable will have on the output variable, and thereby, lastly on the behavior on the motion variable in question. On this basis it is then possible to adjust the input variable in such a way that the output variable produced by the actuator agrees as accurately as possible with the reference variable determined by the controller. If, for example, the controller calls for a rapid acceleration of the vehicle, in order to follow a rapidly accelerating preceding vehicle, the drive system will first react to the acceleration demand with a certain delay. A human driver, who is familiar with the behavior of the vehicle, would compensate for this by first of all stepping on the accelerator more firmly and then letting up again on the accelerator, in order to avoid overshooting when the desired speed has been reached. In the device according to the present invention, this behavior of the driver is largely emulated by compensating for the dynamics of the actuator.

The behavior of an actuator may generally be characterized by a mathematical transform which transforms a time-dependent function (the input variable) into another time-dependent function (the output variable). In the device according to the present invention, linear models are preferably used, i.e. models in which the relationship between the two time-dependent functions may be described by a linear differential equation or a system of linear differential equations. Such linear models are, on the one hand, easy to manage from a computational point of view, and, on the other hand, they reflect the system behavior sufficiently accurately, in most cases.

The model, i.e. the transform, or the system of differential equations on which it is based, may be characterized by a set of parameters. For a given type of transform, the model is able to be optimized and adjusted to the respective physical properties of the actuator in that suitable values for these parameters are inserted. This adjustment of the model may be made ahead of time in the light of experiments, but may optionally also take place or continued concurrently with the operation of the device, so that an adjustment is also possible for changes that are wear-related, deterioration-related or temperature-related in the behavior of the actuator. The model may be optimized currently by constant integration and monitoring of the setpoint/actual deviations.

A feedforward filter may be produced from the model (by inverting the mathematical transform), which, when it is used on the reference variable output by the controller, supplies that input signal to the actuator which will lead to the desired behavior of the actuator.

In general, the operation carried out in the feedforward filter includes at least one differentiation of the reference variable. When the executive function that describes the reference variable is given by a table of values, this differentiation must be performed numerically. However, it is preferred if the controller outputs the executive function directly in the form of an analytical expression, that is, a functional rule, so that the numerical differentiation may be replaced by an analytical differentiation. In this way particularly, interference effects may also be avoided that are caused by signal noise.

In the case of the output variable generated by the actuator, the motion variable of the vehicle may be directly involved, that is, for example, the drive acceleration or the braking slowdown. However, it is also conceivable that the actuator described by the model is only an element of the drive system or the braking system. For instance, in a vehicle having a carburetor engine, the actuator may be formed by a throttle valve actuator. The output signal of the actuator would then be the throttle valve setting.

DETAILED DESCRIPTION

Figure 1:
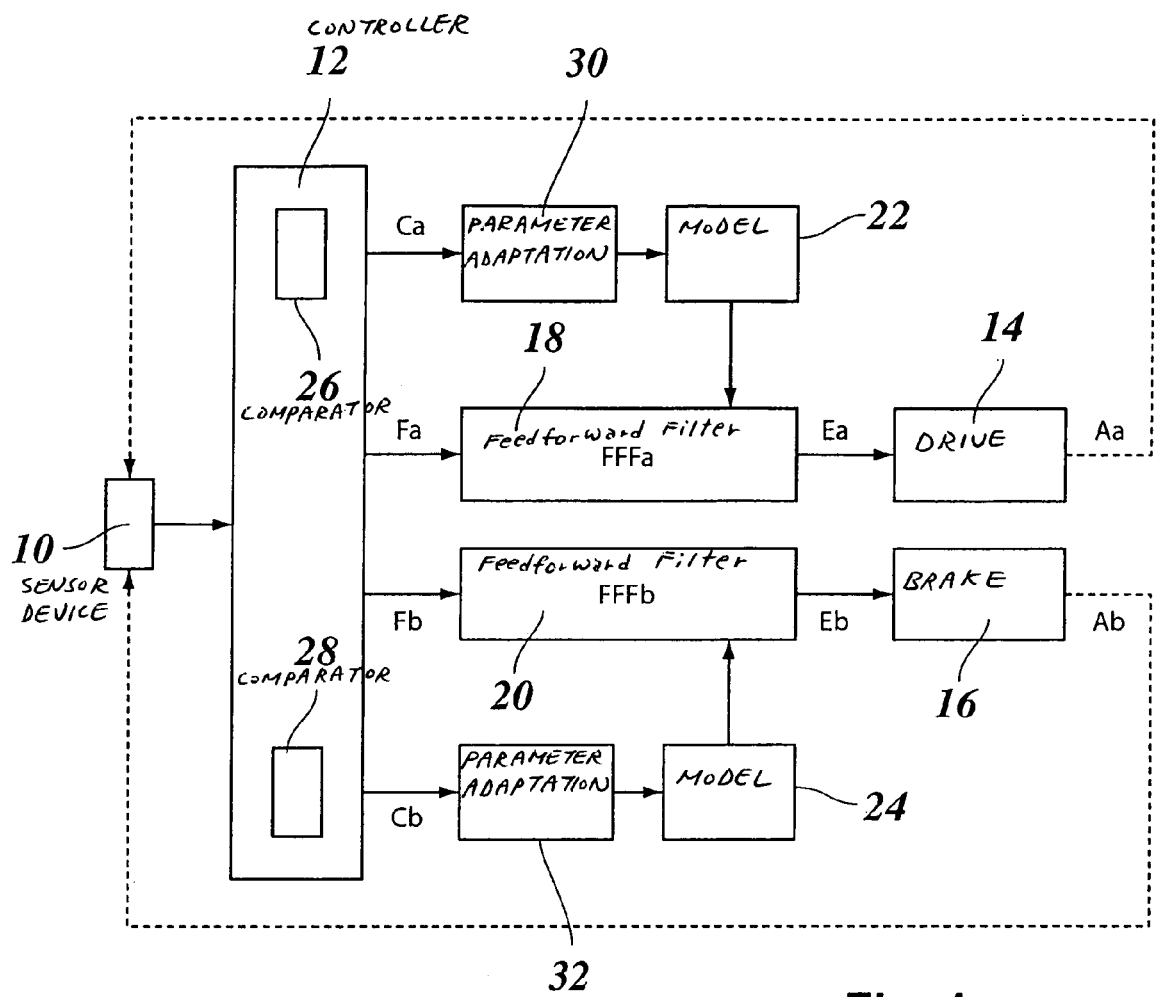
FIG. 1 shows a block diagram of the device according to the present invention.

The device shown in FIG. 1 is installed in a motor vehicle, and has a sensor device 10 and a controller 12. Controller 12, for example, may be an ACC controller, by which the speed of the vehicle is to be regulated to a desired speed specified by the driver, or to a predefined setpoint distance from a preceding vehicle. In this case, sensor device 10 includes at least one radar sensor for measuring the distance and the relative speed of the preceding vehicle. In addition, the sensor device includes sensors which record the motion variables of the vehicle, which are required for the regulating functions in controller 12, especially the driving speed. The acceleration or the slowdown of the vehicle may, if necessary, also be measured directly using an acceleration sensor.

Controller 12 acts upon two actuators 14, 16, which, in the example shown, are formed by the drive system and the braking system of the vehicle. The drive generates a drive acceleration Aa, and the brake generates a braking slowdown Ab. The corresponding speed changes of the vehicle are recorded by sensor device 10, so that the control circuit is closed.

Controller 12 emits a reference variable Fa for actuator 14 (drive). This reference variable represents a setpoint acceleration which is to be generated by the drive. Thus the aim is to activate actuator 14 in such a way that drive acceleration Aa agrees as accurately as possible with the setpoint acceleration determined by Fa. In an equivalent manner, controller 12 also emits a reference variable Fb for actuator 16 (brake).

Reference variables Fa and Fb, however, are not directly supplied to actuators 14, 16, but are first converted to an input signal Ea for the drive and Eb for the brake in compensation elements in the form of feedforward filters 18, 20. Feedforward filters 18, 20 are there for the purpose of compensating for the dynamic behavior of actuators 14, 16 in such a way that as good as possible an agreement of the output variables, that is, drive acceleration Aa and braking slowdown Ab is achieved with the respective reference variable.

Figure 2:
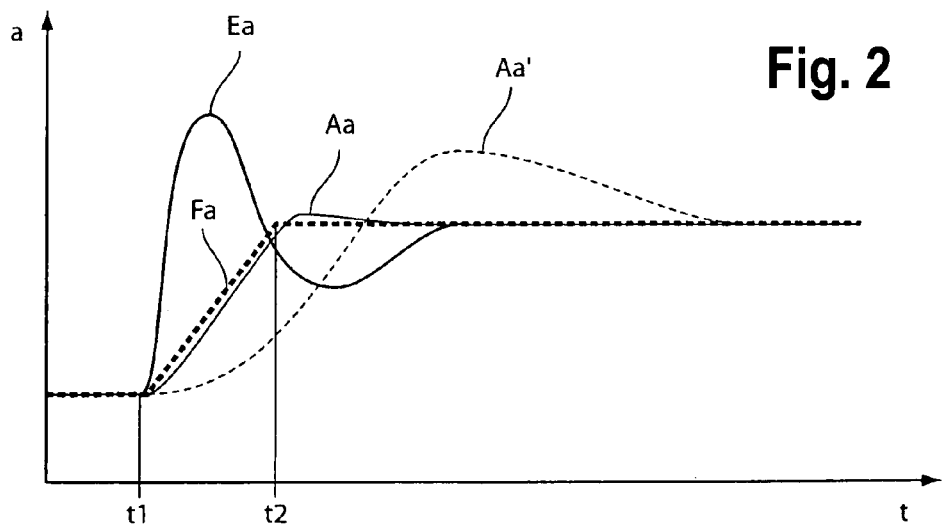
FIG. 2 shows the functional graphs of some signals which appear in the device as in FIG. 1.

This is illustrated in FIG. 2. The curve drawn in in FIG. 2 in bold and broken lines describes the time dependence of reference variable Fa. This reference variable represents a setpoint acceleration, which is at first constant, then rises in ramp-shaped fashion between points t1 and t2, and, beginning at t2, remains constant again at the higher value. If this input variable Fa were used directly as the input signal for actuator 14, then, because of the inertia of the drive system, the output signal of actuator 14 would have a pattern as shown by a thin broken curve Aa'. A bold and solid line in FIG. 2 shows the signal pattern of input signal Ea, which is formed by feedforward filter 18 from reference variable Fa. Since this signal is supplied to actuator 14, the actually obtained output signal Aa has a pattern shown in FIG. 2 by a thin solid curve, and which very closely approaches the original reference variable Fa.

For the calculation of input signal Ea from reference variable Fa, a mathematical model is used that is stored in memory 22 in the device shown in FIG. 1, and which characterizes the dynamic behavior of actuator 14. When input signal Ea is given by a function x(t) and the output signal Aa is given by a function y(t), the model describes a mathematical operation which transforms function x(t) into the function y(t). For the characterization of the model, it is expedient to subject the functions x(t) and y(t) to a Laplace transform. The time-dependent function x(t) then becomes a function X(s), in which the variable s has the dimension time$^{-1}$. In a similar manner, y(t) becomes a function Y(s). A suitable model then, for example, has the form:

$$Y(s)=[V/(1+T_1*s)*(1+T_2*s)]*X(s), \quad (1)$$

wherein V, $T_1$ and $T_2$ are parameters which are to be adjusted in such a way that the actual dynamic behavior of actuator 14 is reproduced as accurately as possible. This model is linear, and in addition has the advantage that it does not include any response time terms (no factors of the form $e^{(-T*s)}$).

The feedforward filter, which results from the model given above, is obtained by simply inverting the transform X(s)->Y(s). In the space of Laplace transformed functions, the feedforward filter thus has the form:

$$F_{FF}=(1+T_1*s)*(1+T_2*s)/V. \quad (2)$$

Now, if reference variable Fa is described by a time-dependent function z(t), one obtains from this by Laplace transformation a function Z(s), and the function x(t), which describes the desired pattern of input signal Ea, is obtained by applying the inverse Laplace transform to the term $F_{FF}*Z(s)$. The function z(t), for example, has the form of a piecewise defined polynomial whose functional rule is transferred from controller 12 to feedforward filter 18 and is there processed analytically. Alternatively, one obtains the function x(t) by formulating the feedforward filter in the time range and applying it to the function z(t). In this connection it is often sufficient to determine x(t) up to a certain order as a Taylor series about t=0.

In a corresponding manner, a model stored in a memory 24 and representing the dynamic behavior of actuator 16 supplies feedforward filter 20 for reference variable Fb.

Controller 12 includes setpoint/actual comparators 26, 28 which register the remaining, generally relatively low deviations between reference variables Fa, Fb and output variables Aa, Ab, appertaining respectively, and which integrate their absolute quantities or their squares over time. If the integrals thus obtained exceed a certain threshold value, this means that the model does not describe the behavior of the respective actuator accurately enough. In that case, a correction signal Ca is emitted to a parametrization module 30 and 32, respectively, and the model parameters (the variables V, $T_1$ and $T_2$) are adjusted afresh, in order to achieve a better agreement. Since it is generally known what effect the individual parameters have on the model, and thereby on the behavior of the feedforward filter, it is possible to set up a suitable algorithm for the parameter adjustment. However, it is alternatively also possible to adjust the parameters "evolutionally", by making small chance changes in the parameters, in each case. Changes that lead to an improvement in the agreement are maintained, whereas changes that lead to a deterioration are discarded.

The functions of controller 12, of feedforward filters 18, 20 and of parametrization modules 30, 32, which are shown in FIG. 1 as separate blocks, may also be carried out in practice by a single, suitably programmed microcomputer.

What is claimed is:
1. A device for the longitudinal guidance of a motor vehicle comprising:
   a sensor device for sensing a location of at least one object in a nearfield of the vehicle;
   a controller for generating a reference variable used in connection with a motion variable of the vehicle for a regulation of a speed of the vehicle, wherein the regulation is achieved as a function of location data of the sensor device;

at least one actuator having an effect on the motion variable as a function of the reference variable;

a memory for storing a mathematical model of the actuator, the mathematical model describing a dynamic behavior of the actuator, the mathematical model providing a relationship between an input variable supplied to the actuator and an output variable of the actuator;

a compensating element for converting the reference variable, via the mathematical model, into the input variable in such a way that the dynamic behavior of the actuator is compensated for; and wherein the reference variable generated by the controller is given by a time-dependent function, and the controller outputs a functional rule of the function to the compensating element.

2. The device according to claim 1, wherein the at least one actuator includes a plurality of actuators, and the controller has an effect on the plurality of actuators to each of which a mathematical model is assigned.

3. The device according to claim 1, wherein the at least one actuator includes a drive system of the vehicle.

4. The device according to claim 1, wherein the at least one actuator includes a braking system of the vehicle.

5. The device according to claim 1, wherein the mathematical model is a linear model.

6. The device according to claim 1, wherein the compensating element includes a feed forward filter.

7. The device according to claim 1, further comprising:

a setpoint/actual comparator for comparing the output variable to the reference variable; and a parameterization module for adjusting model parameters as a function of comparison results of the computer.

* * * * *